(12) United States Patent
Durairaj et al.

(10) Patent No.: US 11,972,304 B1
(45) Date of Patent: Apr. 30, 2024

(54) SYSTEMS AND METHODS FOR AUTOMATIC DETECTION OF AN EVENT AND PROVIDING RESOURCES CUSTOMIZED BASED ON THE EVENT

(71) Applicant: United Services Automobile Association (USAA), San Antonio, TX (US)

(72) Inventors: Ravi Durairaj, San Antonio, TX (US); William Daniel Farmer, Carrollton, TX (US); Joel S. Hartshorn, Port Orchard, WA (US); Qunying Kou, San Antonio, TX (US); Gregory Yarbrough, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 430 days.

(21) Appl. No.: 17/329,878

(22) Filed: May 25, 2021

(51) Int. Cl.
| | | |
|---|---|---|
| *G06F 9/50* | (2006.01) | |
| *G10L 15/18* | (2013.01) | |
| *H04L 67/55* | (2022.01) | |
| *G10L 15/08* | (2006.01) | |

(52) U.S. Cl.
CPC ........ *G06F 9/5094* (2013.01); *G10L 15/1815* (2013.01); *G10L 15/1822* (2013.01); *H04L 67/55* (2022.05); *G10L 2015/088* (2013.01)

(58) Field of Classification Search
None
See application file for complete search history.

(56) References Cited

U.S. PATENT DOCUMENTS

| | | | |
|---|---|---|---|
| 6,724,876 | B2 | 4/2004 | Williams et al. |
| 9,646,610 | B2 * | 5/2017 | Macho .................... G10L 15/22 |
| 9,772,677 | B2 * | 9/2017 | Eide ....................... G06F 1/329 |
| 10,176,640 | B2 | 1/2019 | Tierney et al. |
| 10,423,216 | B2 * | 9/2019 | Hooker ................. G06F 9/5044 |
| 10,726,370 | B1 * | 7/2020 | Bernacki ............ G02B 27/0172 |
| 11,423,756 | B2 * | 8/2022 | Dawes .................... H04L 63/08 |
| 11,522,766 | B2 * | 12/2022 | Boussac ................. G06N 20/00 |
| 11,775,797 | B2 * | 10/2023 | Khoche ................... B32B 37/12 |
| | | | 235/492 |
| 11,786,655 | B2 * | 10/2023 | Vleugels ........... A61M 5/14248 |
| | | | 604/503 |
| 2006/0252417 | A1 | 11/2006 | Abramson et al. |

* cited by examiner

*Primary Examiner* — Van H Nguyen
(74) *Attorney, Agent, or Firm* — Fish & Richardson P.C.

(57) ABSTRACT

Implementations are disclosed to automatically evaluate, detect, or predict an event, and provide customized virtual assistance to a user based on the event. The implementations include a system capable of pulling data from a client device, detecting an event based on the pulled data, and pushing customized digital resources to the client device based on the detected event.

20 Claims, 12 Drawing Sheets

SYSTEMS AND METHODS FOR AUTOMATIC DETECTION OF AN EVENT AND PROVIDING RESOURCES CUSTOMIZED BASED ON THE EVENT

BACKGROUND

Computing systems are being used to provide services and assistance to users. For example, in response to receiving a call at a call center, a bot can provide dialing options to the calling user and direct the call to a proper customer service department based on the option that the user selects.

SUMMARY

The present disclosure provides computer-implemented methods and systems that provide an automatic service to a user of a client device based on the needs of the user. The implementations described herein can detect or predict the user's needs and provide corresponding services to the user by performing a series of data pushing and pulling operations.

In some implementations, the present method include: pulling, in a first power mode of at least a portion of the data processing system, occurrence data indicative of an occurrence in proximity to a client device; parsing the received occurrence data; based on the parsing, detecting, in the occurrence data, an occurrence of a specified event; and based on the detecting, accessing, from a hardware storage device, a plurality of nodes and associations among the nodes, with the associations specifying one or more sequences for accessing contents of the nodes, and with at least a first one of the nodes storing instructions representing one or more rules with associated one or more conditions, satisfaction of which specifies one or more digital resources to push to the client device; detecting that the occurrence of the specified event satisfies the one or more conditions associated with the one or more rules of the first one of the nodes; and switching the portion of the data processing system from the first power mode to the second power mode, wherein the first power mode consumes a lesser amount of power, relative to an amount of power consumed in the second power mode; and in the second power mode, pushing, to the client device through one or more communication channels, the one or more digital resources specified by at least the first one of the accessed nodes, wherein the one or more digital resources are each customized for the detected occurrence of the specified event; pulling, from the client device through the one or more communication channels, interaction data specifying an interaction with at least one of the one or more digital resources; based on the interaction data, identifying, in the hardware storage device, an association between a second node and the first one of the accessed nodes; accessing, from the hardware storage device, contents of the second node; and pushing, in livetime relative to a time of the interaction, the contents of the second node to the client device, with the contents being rendered as one or more visualizations on a display of the client device.

At least some implementations include one or more of the following features: at least part of the hardware storage device that is on a low power mode during the first power mode and turns to a high power mode during the second power mode; detecting the occurrence of the specified event comprises identifying, in the hardware storage device, a specified event that matches or is relevant to information included in the occurrence data; detecting the occurrence of the specified event comprises: predicting a likelihood of the specified event happening in a future time, wherein the predicting is based on the occurrence data and subsequent occurrence data that the data processing system pulls from the client device, and detecting the occurrence of the specified event in response to determining that the likelihood is greater than a specified threshold value; detecting the occurrence of the specified event comprises performing speech recognition on the occurrence data to detect one or more key words or phrases that are mapped, in the hardware storage device, to the specified event; the one or more digital resources include at least one of a signature card, a form, a document, or an augmented reality bot to assist a user of the user device on what to do; the specified event is a check engine light or a request identified based on an engagement with an avatar in a virtual environment.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Methods in accordance with the present disclosure may include any combination of the aspects and features described herein. That is, methods in accordance with the present disclosure are not limited to the combinations of aspects and features specifically described herein, but also include any combination of the aspects and features provided.

Among other advantages, the present implementations provide the following benefits. The present implementations can be used in detecting or predicting the needs of a user and provide services to the user based on those needs. Some implementations detect or predict the needs by facilitating an automatic conversation with the user, for example, by using a questionnaire that is customized based on the events that happen in proximity of the client or the previous answers that the client have already provided. Some implementations detect or predict the user's needs based on activities that happen around the user, for example, by using information of one or more sensors that have detected a malfunction on a machine or have detected utterance of a key phrase by the user. Accordingly, the implementations can reduce the risk of accidents because they keep monitoring the sensors and can suggest or provide services to the user before an issue with a sensor become critical.

Further, the systems implemented herein detect or predict the user's needs automatically. The system does so by based on a series of pushing and pulling data to and from the user's client device. Accordingly, the interactions with the user may be minimized to reduce interrupting the user. This feature by itself reduces the chance of accidents that may happen due to the user's postponement of taking care of a sensor or a malfunction in a machine, e.g., a car.

The implementations are particularly beneficial in emergency situations and accidents to accelerate submission of a request for help, submission of an insurance claim, communicate with a customer service, etc.

The implementations also provides solutions that reduce power usage in computing systems. Some of the systems described herein can keep working on a low-power mode while the system is monitoring the data that is being used by a client device of the user, and switch to a high-power mode in case that the system detects an occurrence of an event on or in proximity of the client device.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
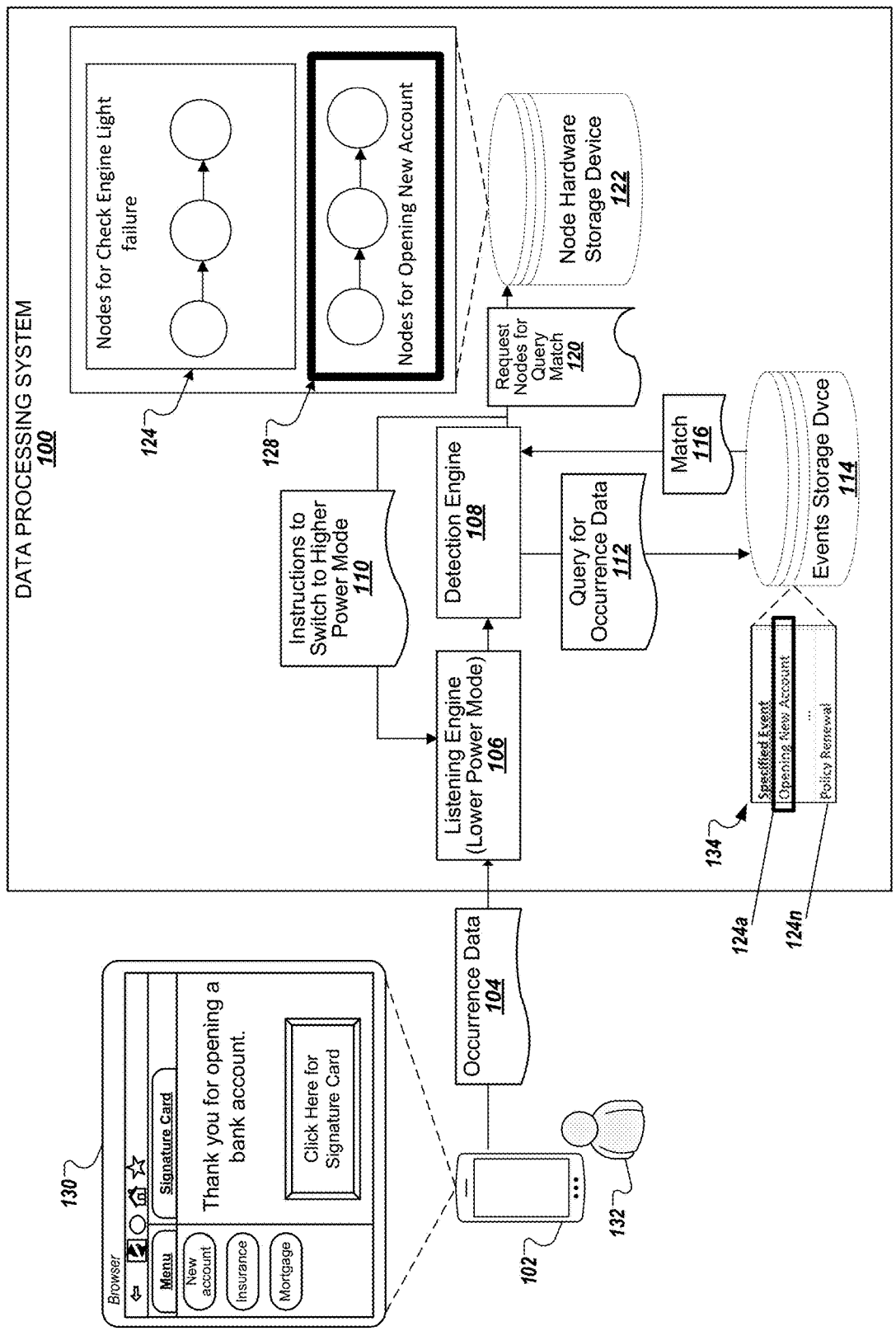
FIG. 1 depicts a system according to implementations of the present disclosure.

The present implementations provide for automatic communications between a client device and a data processing system to detect, evaluate, or predict the needs of a user of the client device in real-time, to suggest services to the user based on those needs, and to assist the user to receive one or more of the suggested services. The data processing system performs these operations by automatic pulling and pushing of data from and to the client device.

The data processing system can predict or determine the user's needs by detecting an occurrence of an event. The event can be a check-engine light turning on, which can indicate that the user may have been in an accident and may need help to be rescued or to submit an insurance claim. The system can detect such event by pulling data from the user's client device. The client device can be a sophisticated computing device such as a smart phone, a personal digital assistance device (PDA), a laptop, a smart watch, etc., or can be a set of one or more sensors that are attached to the user's car and are in communication with the data processing system directly or indirectly through a sophisticated computing device.

The system can determine that the event is a check-engine light event and push relevant digital resources to the client device to suggest solutions or assist the user in fixing the underlying issue with the check-engine light. The pushed digital resources can include an avatar or a bot that can communicate with the user and assist him in in real-time. For example, the avatar can ask the user questions customized for this particular event, for example, questions about whether the use is in an emergency situation such as an accident or about the maintenance history of the car. The system pulled the user's answers, and pulls customized solutions to the user.

As another example, the data processing system can detect or predict the event based on an engagement of the user with an avatar in a virtual environment. For example, they user may engage with the avatar to open a bank account. The system detects the event of opening a bank account by pulling relevant data from the client device, for example, while the user is engaging with the avatar. Based on this prediction or detection, the system can push customized digital resources such as a signature card or other forms that the user would need for opening the bank account. The system then pulls the user's interactions with one or more of the digital resources to proceed on opening the bank account. The system may push subsequent digital resources such as a thank you note to the user.

The event can be initiated directly by the user, or can be recognized from data that client device gathers from its environment. For example, the user can initiate opening the bank account directly by starting relevant operations executed on the client device such as by opening a relevant page on a mobile application or a website of the bank. The event can be recognized from the data that the client device gathers from its surroundings, for example, by performing sound, voice, or speech recognition or gathering the user's statement on her desire to open a bank account. The data processing system can pull this information from the client device and can analyze this information to detect an underlying event. For example, the system can parse and map user's speech data to one or more key words and phrases that are mapped to a specific event, and identify the specific event as the detected event.

FIG. 1 depicts an example data processing system 100 ("system 100") and a client device 102 that can be used to execute implementations of the present disclosure. Data processing system 100 can send and receive information to and from client device 102 by pushing and pulling data. System 100 and client device 102 can communicate wirelessly, e.g., through a local LAN or satellite, or in a wired manner, e.g., through a cable.

System 100 includes listening engine 106, detection engine 108, and storage devices 114 and 122. Listening engine 106 "listens" to or monitors the processes or activities executed on or in proximity of client device 102 by pulling occurrence data 104 from client device 102. Listening engine 106 forwards the pulled occurrence data 104 to detection engine 108. Detection engine communicates with events storage device 114 to detect an occurrence of an event among a list of events stored in event storage device 114. If a match is found, detection engine 108 communicates with node hardware storage device 122 to push to client device 102 one or more digital resources that are customized for the detected event.

Listening engine 106 can continuously monitor the activities that happen on or in proximity of client device 102, or can send periodic inquiries to client device 102 to inquire for the activities that are currently happening or have recently happened. Listening engine 106 can include one or more antennas for sending the inquiries and for receiving occurrence data 104. Listening engine 106 can pre-process occurrence data 104, for example, to remove account information of user 132 or client device 102's information, before sending the occurrence data 104 to detection engine 108.

Detection engine 108 parses the occurrence data 104 to detect information about an occurrence of an event. Detection engine 108 sends a query 112 for occurrence data to events storage device 114 to determine whether the information included in occurrence data 104 matches or is related to any of the specified events listed and stored in events storage device 114. If a relevancy or a match 116 is found, detection engine 108 determines that one of the specified events has happened or is about to happen.

Events storage device 114 stores a plurality of specified events (e.g., 124a, 124n) in a table of events 134. The table of events can store the specified events in a categorized manner. The categories can be based on a level of urgency, the type of initiation of the events (e.g., pulling an alert from a sensor, or a user interaction data from a client device), etc.

In the example depicted in FIG. 1, detection engine 108 detects that the event of "opening a new account" has occurred (or is about to occur) because this event matches one of the specified event stored in the events storage device 114.

Detection engine 108 then sends a request (120) to node hardware storage device 122 for nodes associated to the detected event. Node hardware storage device 122 and events storage device 114 can be parts of the same storage device. Each of the specified events (or data representing an event, collectively referred to herein as "events"—for purposes of convenience and without limitation) stored in the events storage device 114 is associated with or mapped to a respective group of nodes stored on the node hardware storage device 122. Generally, a node includes a data record structured with fields of a particular location of data storage for storage of the data record. For example, the "opening new account" event 124a on event storage device 114 is mapped to the group of nodes 128 on node hardware storage device 122.

Figure 2:
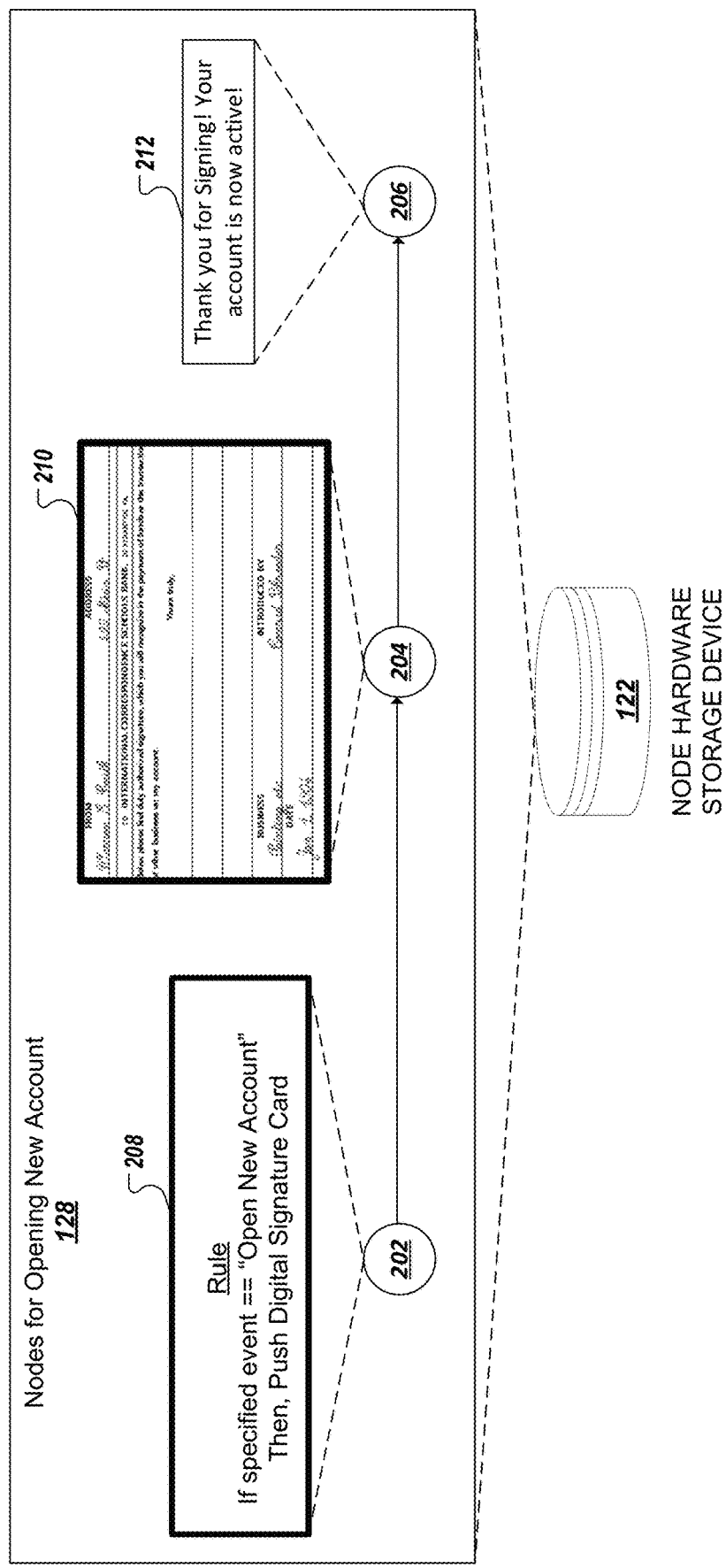
FIGS. 2 and 4 show a block diagram of an example of the group of nodes and associations among the nodes in a hardware storage device according to implementations of the present disclosure.

FIG. 2 shows an example of the group of nodes 128 and associations among the nodes. The associations can specify one or more sequences for accessing contents of the nodes. For example, node 206's content 210 can be accessed only after accessing node 202's content 208 and node 204's content 212.

At least one of the nodes includes instructions representing one or more rules with associated one or more conditions. The rule specifies one or more digital resources to be pushed to the client device upon satisfaction of the one or more conditions. For example, node 202 includes a conditional rule, that if satisfied, causes pushing to client device 102 a digital signature card 210 stored on node 204. Another conditional rule can be pushing a particular electronic form to client device 102 in response to determining that a likelihood of the detected event occurring in a close future (e.g., within the next five minutes) is greater than a specified threshold value. More details about the event prediction is provided below.

Figure 3:
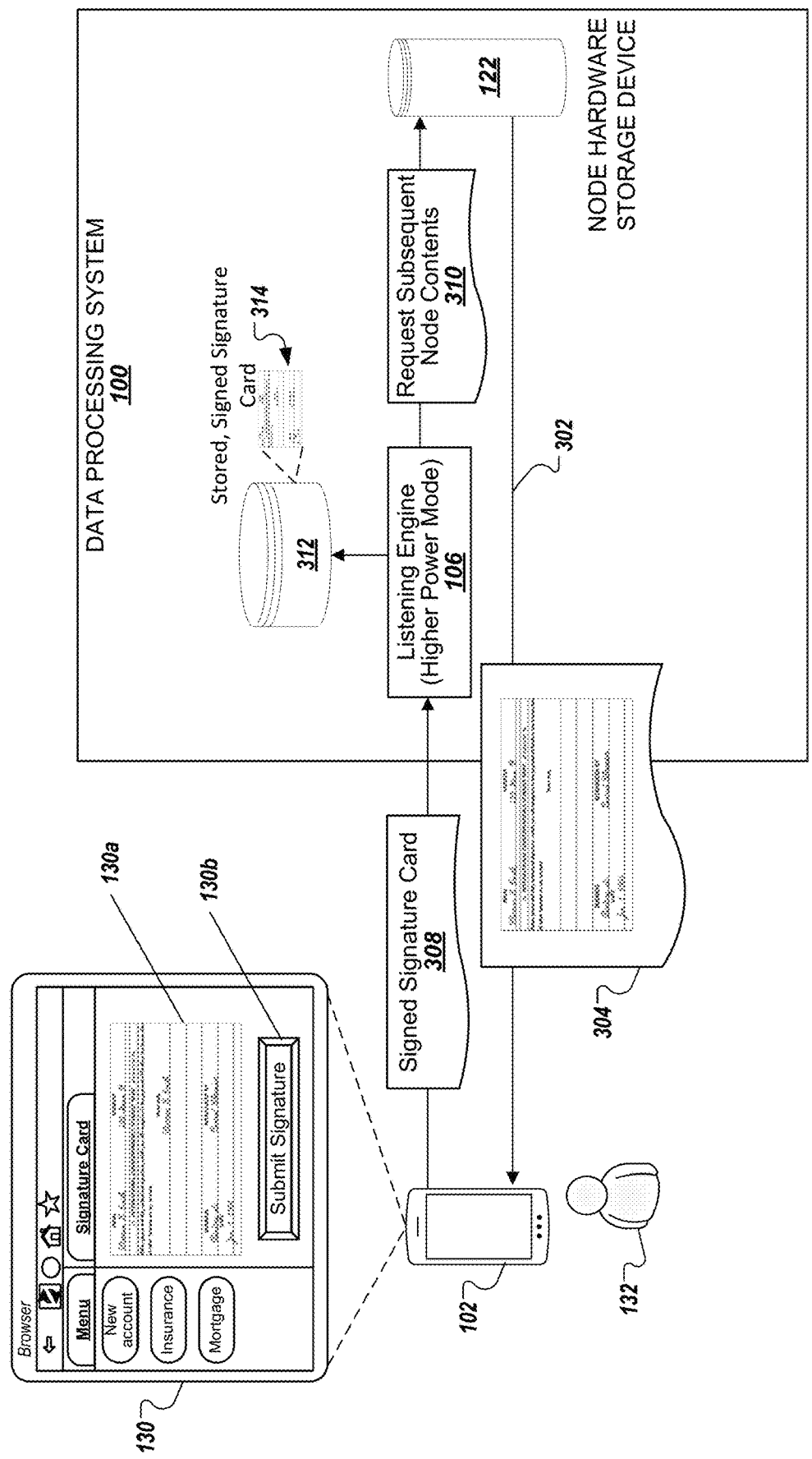
FIG. 3 shows example push and pull operations executed according to implementations of the present disclosure.

FIG. 3 shows a pushing process, where a digital resource 304 including the digital signature card 210 is pushed to client device 102 for presentation to user 132. System 100 can push digital signature card 210 or any other digital resources through one or more communication channels such as through wireless or wired connections between system 100 and client device 102.

As noted above, system 100 can customize the digital resources based on the detected event before pushing those resources to client device 102. For example, system 100 may add the name of the bank or information of user 132 to digital signature card 210 before pushing the card to client device 102, or may push specific digital forms that this particular bank requires, for example, for a background check on the user.

User 132 can respond to the received digital resources by interacting with client device 102. For example, user 132 can review a visual representation 130a of the digital signature card on display or graphical user interface 130 and submit hi/hers signature, for example, by clicking on a particular button 130b rendered in graphical user interface 130 displayed on client device 102.

Listening engine 106 of system 100 pulls from client device 102 interaction data that specifies user 132's interaction with the signature card. The signed signature card 314 can be associated with user 132 and be stored in a data storage device 312 that stores information about bank accounts.

In some implementations, system 100 reviews the interaction data to determine subsequent information to be pushed to client device 102. For example, user 132 may submit different interactions such as submitting a signature, asking a question about a particular part of the signature card, closing the signature card, etc. System 100 can push subsequent information based on the user's interaction with the signature card.

Figure 4:
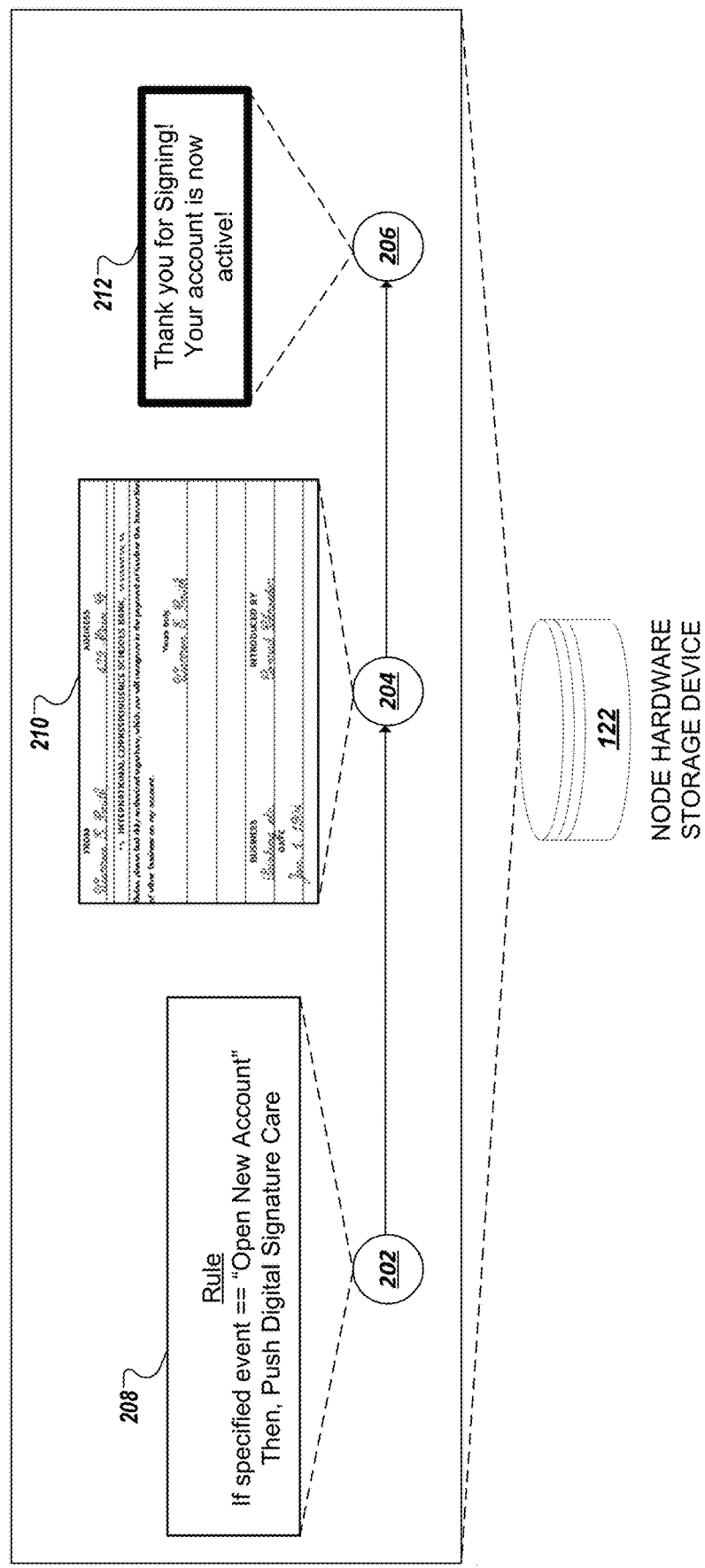
Figure 5:
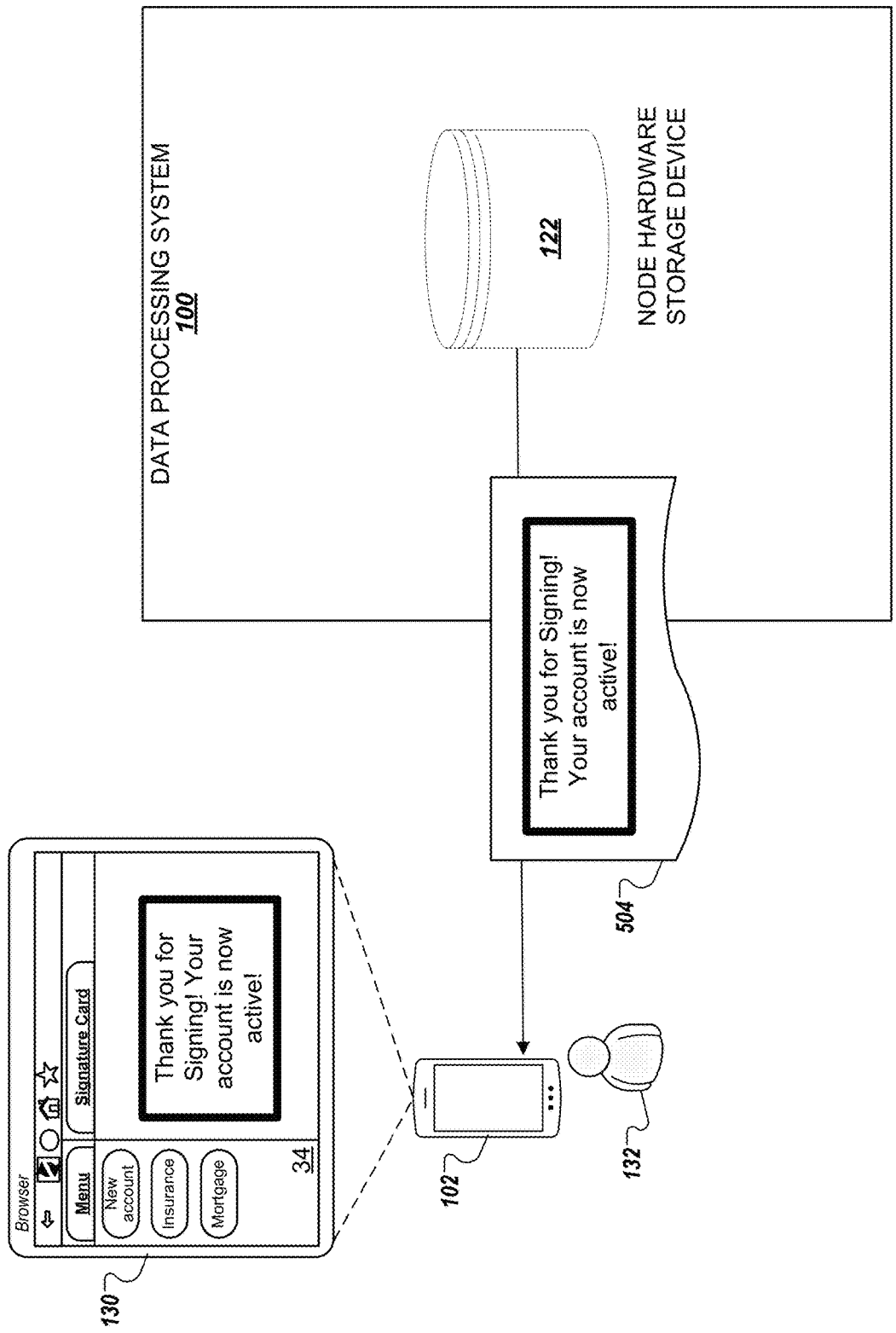
FIG. 5 shows an example push operation according to implementations of the present disclosure.

To obtain the subsequent information, listening engine 106 requests from node hardware storage device 122 subsequent node contents 310 from the group of nodes 128. As shown in FIG. 4, node 206 is determined to be the subsequent node. System 100 can then push content of node 206 to client device 102, as shown in FIG. 5.

In another example, system 100 can modify content of node 206 or generate information based on the content of node 206 instead of sending the same content to client device. For example, system 100 may add information of user 132 or the bank, or the date of creating the account to the content of node 206 before sending the content to client device 102. The content or the modified content can be rendered as one or more visualizations on the display 130 of client device 102.

System 100 can push the data in real-time or in live-time relative to a time of user 132's interaction with the digital resources that system 100 had pushed to client device 102. For example, from user 132's perspective, once the signature is submitted (FIG. 3), client device 102 displays, in a relatively live manner, a thank you message (504) that is pushed from system 100 to client device 102.

In some implementations, system 100 operates in lower power mode before detecting an occurrence of a specified event, and switches to a higher power mode when detection engine 108 of the system detects the occurrence of a specified event. The lower power mode consumes a lesser amount of power, relative to an amount of power consumed in the higher power mode.

Once detection engine 108 detects the occurrence of an event, detection engine 108 can signal the rest of the system to switch to a higher power mode (110 in FIG. 1). System 100 can push the digital resources (e.g., a signature card, an electronic document, an augmented reality avatar to assist user 132 respond to an event) to client device 102 and assess user interactions with the digital resources when the system operates in the higher power mode.

In the lower power more, at least some components of system 100 can be in low power mode by suspending their operations, for example, being off or sleep. For example, system 100 can hibernate the busses between the node hardware storage device 122 and other components of the system, the processors that modify data before pushing data to client device 102, a transmitter that sends data out of system 100, etc.

In the lower power mode, at least some components of system 100 can operate in a low-power mode by performing only a portion of their functions. For example, during the lower power mode, listening engine 106 can pull occurrence data 104 from client device 102 while suspending its communications with node hardware storage device 122 (see FIG. 1). Listening engine 106 can restore its communication with hardware storage device when system 100 operates in the higher power mode.

In some implementations, system 100 requires an authentication of user 132 before pushing digital resources to the client device 102. The authentication may be required for pushing any digital resources, or for pushing only particular digital resources, e.g., a customized signature card. The authentication can be done electronically, for example, through a face, a voice, or a finger print recognition, can be a multi-step authentication that would require the user to submit an access code, or can be any commonly known form of authentication procedures.

In some implementations, detection engine 108 can use occurrence data 104 to predict occurrence of an event such as user 132's desire to open a bank account before the user takes any actions towards that desire on client device 102. For example, client device 102 may detect the local area network (LAN) of a bank with which the user does not have an account. Detecting the LAN of the bank indicates that the user has likely entered a building of the bank. Listening engine 106 pulls information on the detection of the LAN, and detection engine 108 identifies the specified event of "opening new account" as a relevant event and predict a likelihood of opening an account happening in a close future.

Detection engine 108 can use subsequent occurrence data (e.g., speech data) that is pulled from client device 102 to tune or adjust the predicted likelihood. If detection engine 108 determines that the likelihood is greater than specific threshold, detection engine 108 identifies the specified event as a forecasted event and requests relevant digital resources to be pushed to client device 102. Detection engine 108 is also capable of training itself based on the user's responses to pushed resources so that the system 100 can make more accurate predictions in future.

FIGS. 6 through 10 provide another example of application of the present implementations, where the event is a car's check-engine light turning on. Although a car and a check engine light are depicted in these figures, similar concepts apply to any other devices or sensors that can communicate with the client device 102. For example, similar concepts can be applied to electronic household devices such as refrigerators, washing machines, or vacuums that are capable of communicating with client device 102.

Figure 6:
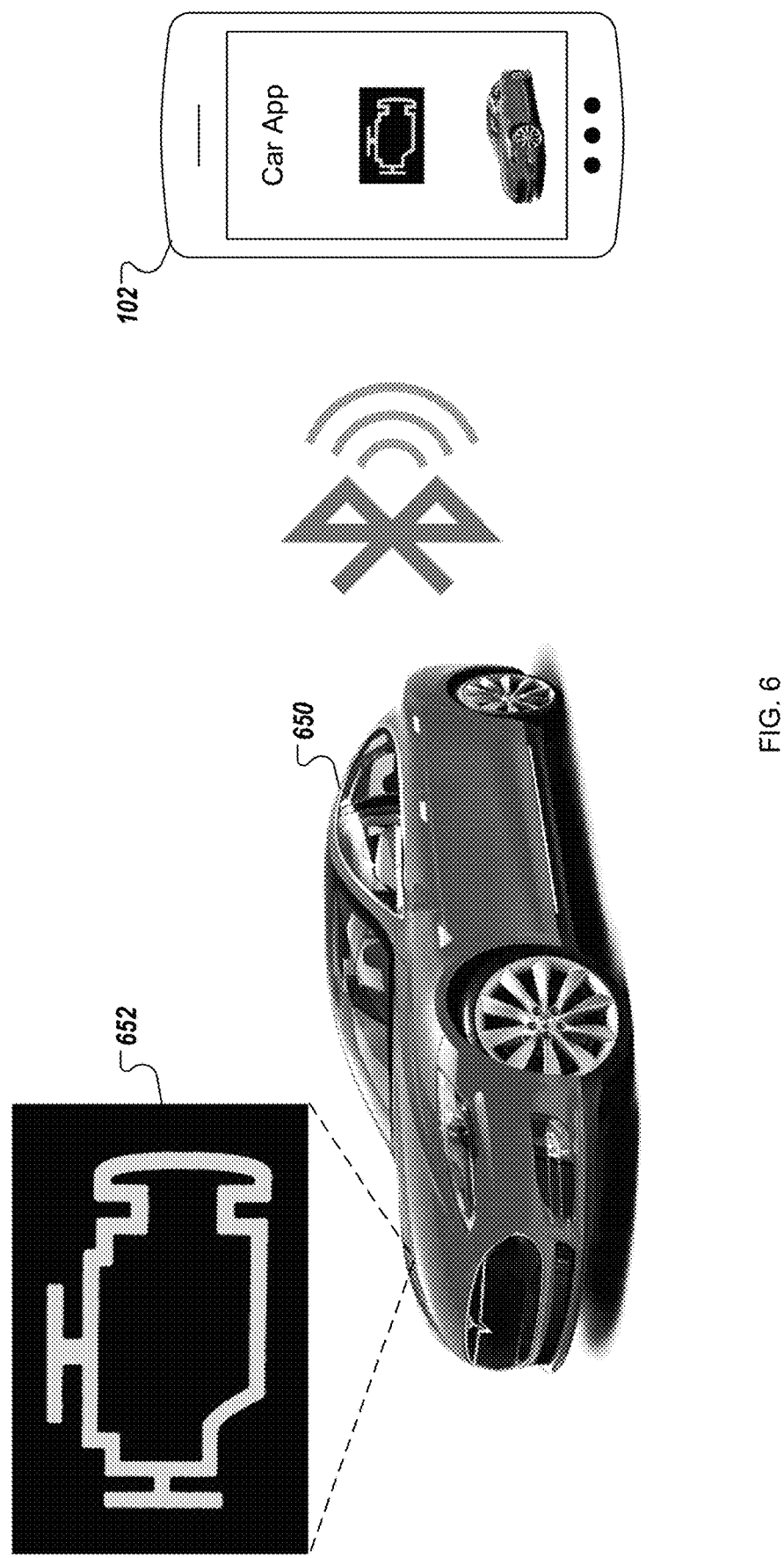
FIG. 6 depicts an example application of the present implementations.

The car 650 in FIG. 6 communicates with client device 102 wirelessly, for example, through a Bluetooth connection. Alternatively, or in addition, car 650 can communicate with client device 102 through a wired connection, for example, during an annual service of car 650 at a repair shop.

Car 650 includes one or more sensors that monitor operations of respective component of car 650. In case that any of the sensor senses a malfunction in a respective component, the sensor turns on to provide a warning about an issue with the component. For example, check-engine light 652 turns on when at least one sensor corresponding to the engine of car 650 detects an issue with the engine.

Car 650 communicates to client device 102 information of the sensors that have detected an issue. Accordingly car 650 reports the check-engine light 652 to client device 120. In some implementations, client device 102 pulls this information from car 650.

Figure 7:
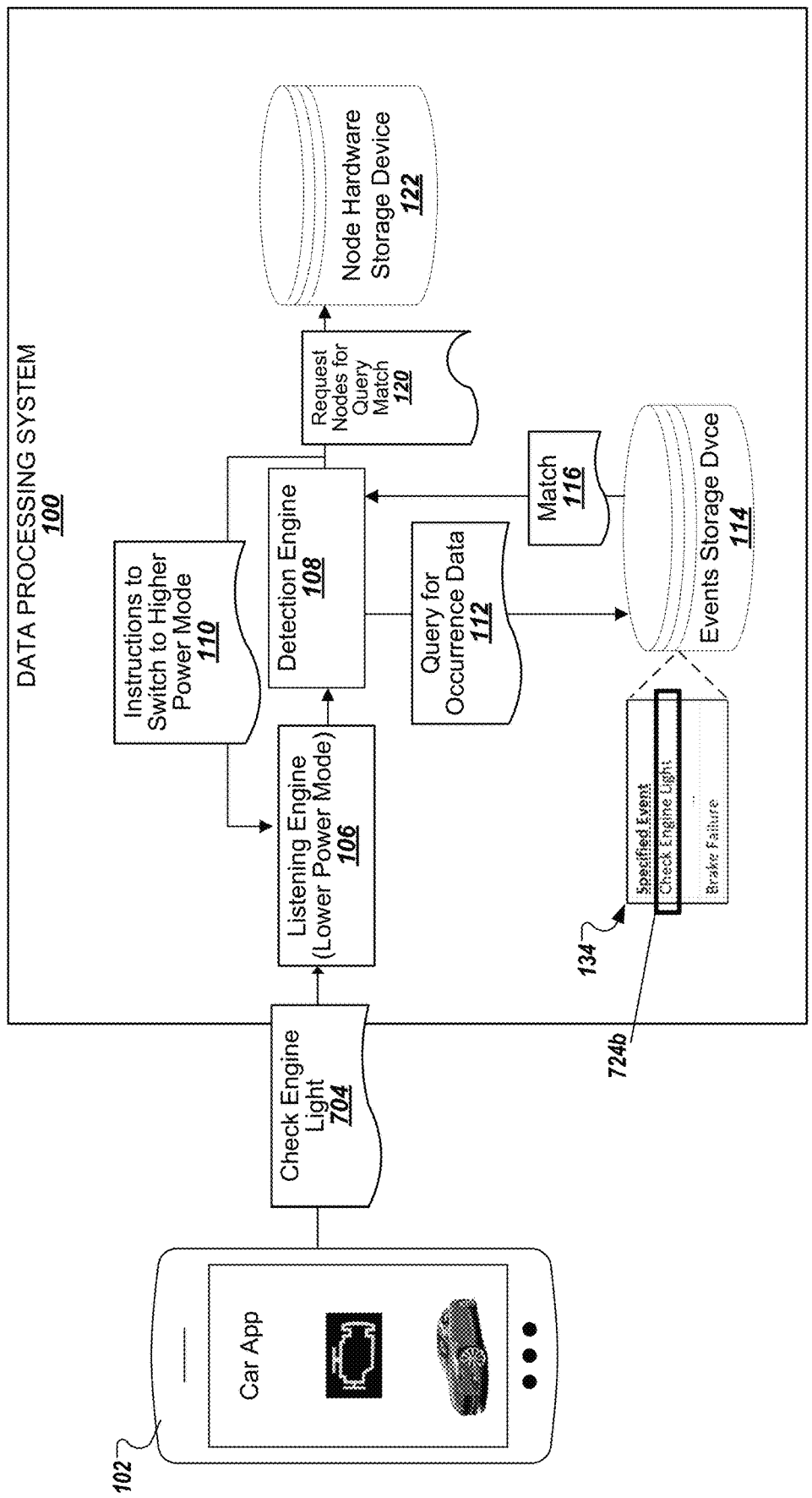
FIG. 7 depicts implementing the example application of FIG. 6 on the system of FIG. 1.

Similar to FIG. 1, FIG. 7 illustrates the operation of data processing system 100 in response to receiving occurrence data. Detection engine 108 performs a similar process explained above with respect to FIG. 1, to identify occurrence of an event from the list of events stored in the events storage device 114.

Unlike FIG. 1, the occurrence data in FIG. 7 is check-engine light 704, and the specified event (724*b*) detected by the detection engine 108 is the check-engine light being on. As a result the nodes associated with the check-engine light (i.e., group of nodes 124 in FIG. 1) in node hardware storage device 122 can be different from the group of nodes 128 explained for the event discussed in FIG. 1, i.e., the event of opening a new account.

Figure 8:
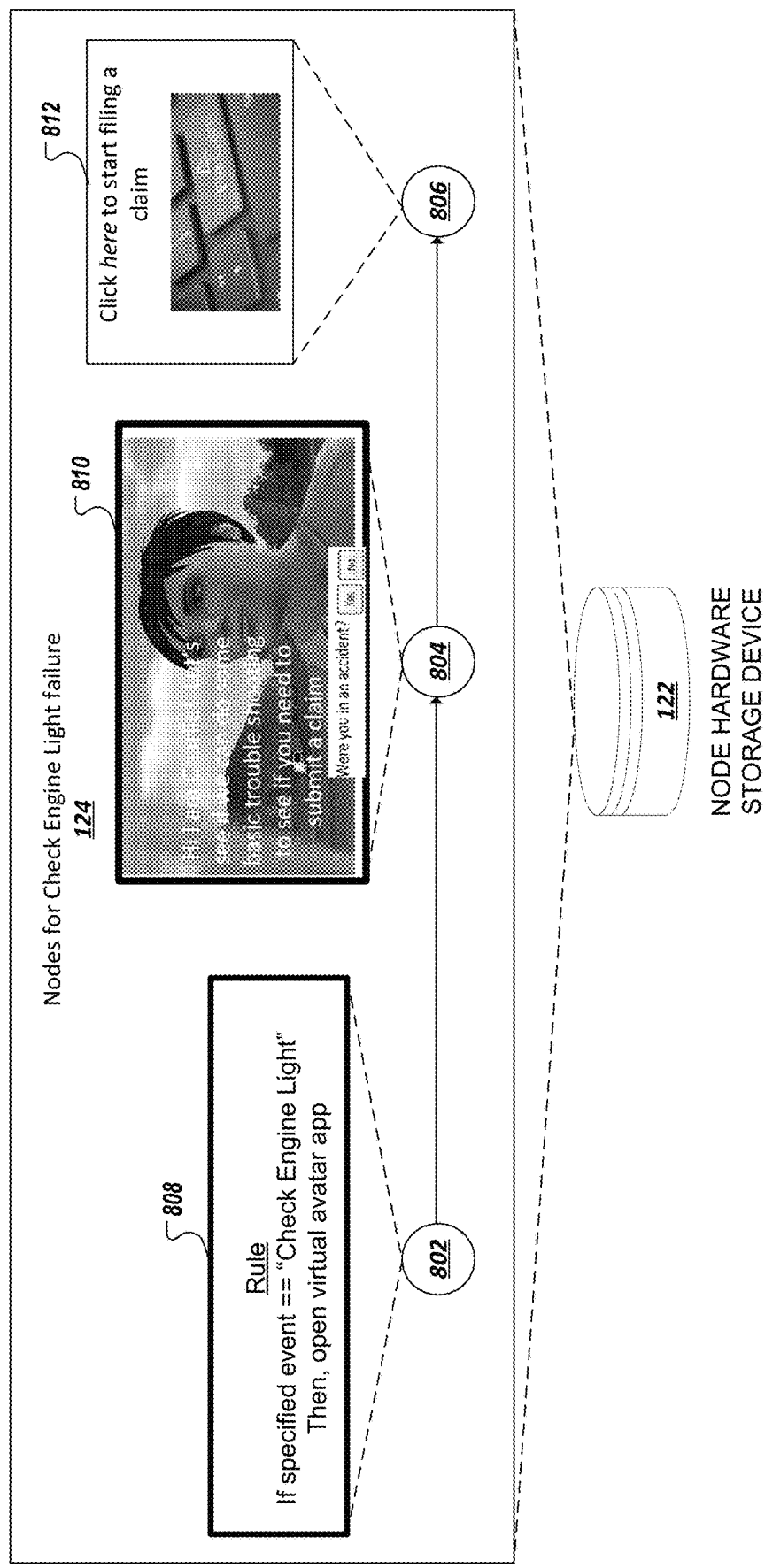
FIG. 8 shows a block diagram of an example of the group of nodes and associations among the nodes in a hardware storage device according to implementations of the present disclosure.

An example of group of nodes 124 corresponding to the check-engine light event and an association between those nodes is shown in FIG. 8. Similar to the group of nodes shown in FIG. 2, the association between the nodes in FIG. 8 specifies one or more sequences of accessing contents of the nodes. For example, node 806's content 812 would be accessed after accessing node 802's content 808 and node 804's content 812.

Node 802 stores instructions representing one or more rules associated with one or more conditions, satisfaction of which specifies one or more digital resources to be pushed to the client device. The digital resource specified in node 802 is a virtual avatar app 810 that is stored in node 804. The virtual avatar app 810 includes an avatar and one or more predefined questions to be asked from user 132 of client device 102. The content of node 804, for example, the questions, is customized for the engine-light event.

Figure 9:
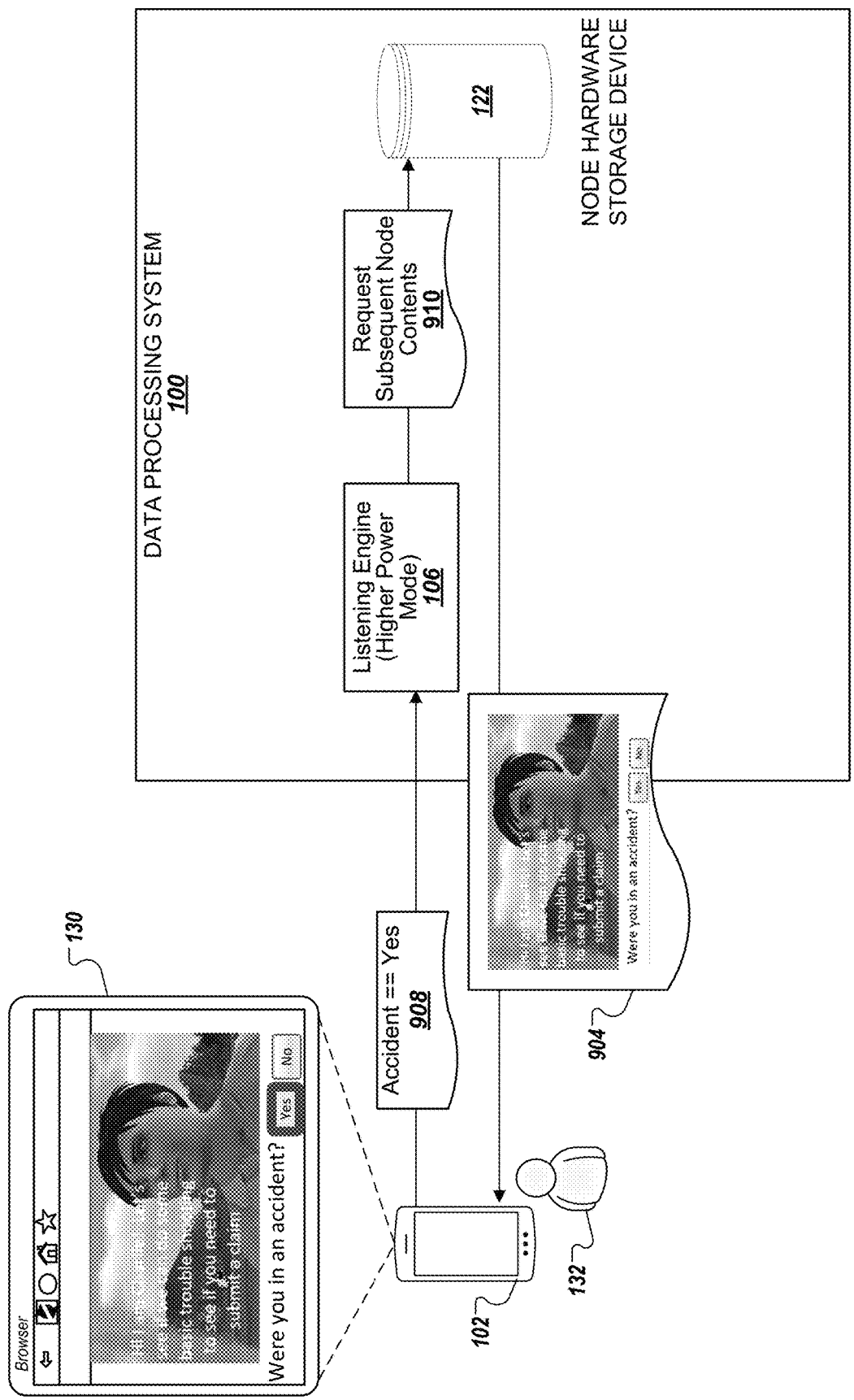
FIG. 9 shows example push and pull operations executed according to implementations of the present disclosure.

As shown in FIG. 9, upon satisfaction of the conditions specified in node 802, system 100 pushes (904) the virtual avatar app 810 or a modified version of the app to client device 102. For example, the system may modify the app by adding information of user 132 or car 650 to the virtual avatar app 810 before pushing the app to client device 102.

Virtual avatar app 810 is displayed on display 130 or client device 102 to ask the stored questions from the user. User 132 interacts with the app through client device 102 by submitting answer(s) to respective question(s). The app can communicate with the user verbally, through text, or through figures and sign language. For example, a virtual avatar representing an operator of an insurance company can ask the questions from user 132.

System 100 pulls interaction data 908 from client device 102, and perform operations similar to what was discussed above with respect to FIGS. 3 and 4, to obtain contents of one or more subsequent nodes based on the user's interaction data. For example, listening engine 106 requests subsequent node content (910) from node hardware storage device.

Figure 10:
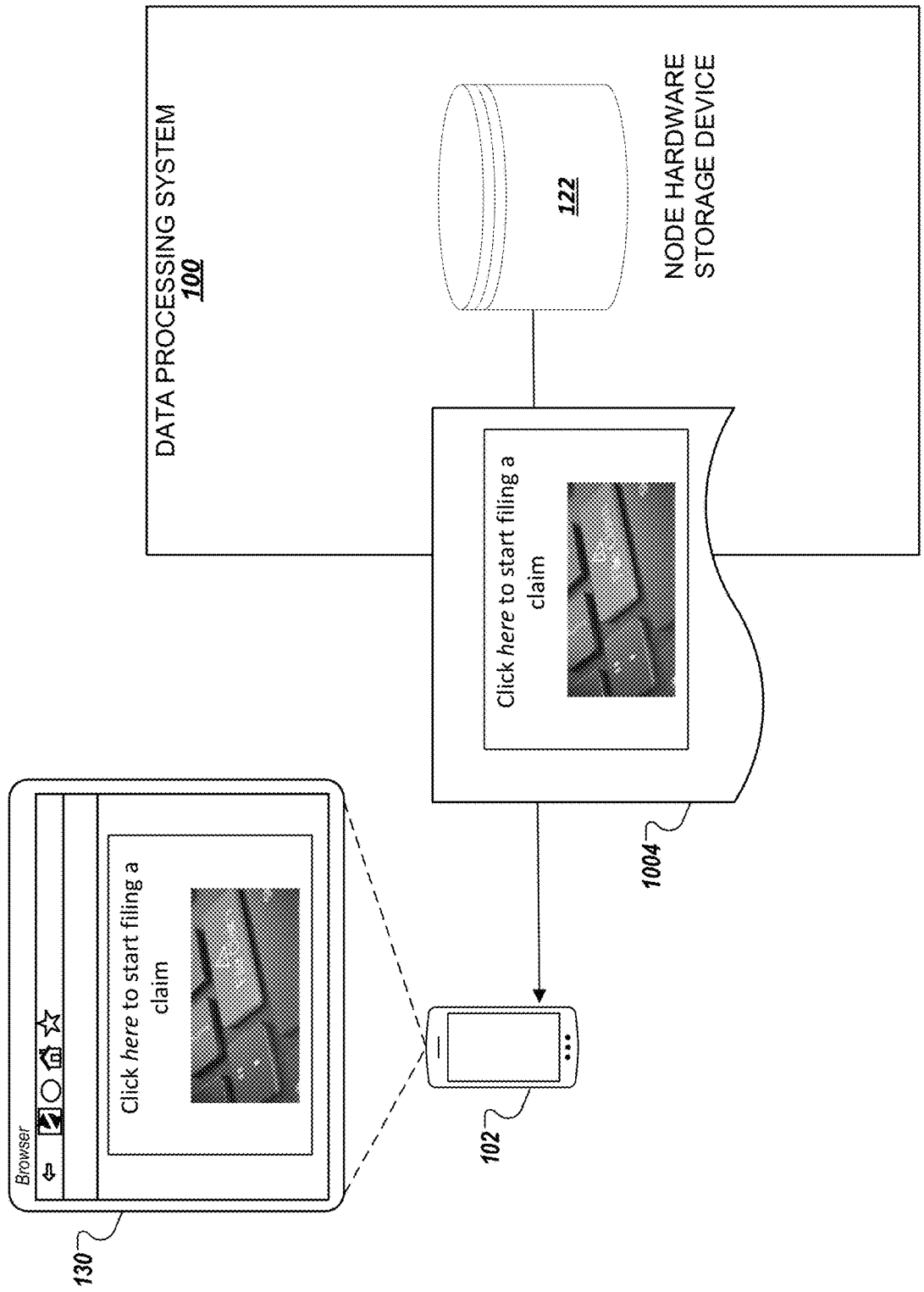
FIG. 10 is an example push operation according to implementations of the present disclosure.

In the example depicted in FIGS. 8 through 10, in response to receiving the interaction data that indicates user 132 has been in an accident, system 100 determines that the subsequent node is node 806 and pushes (1004 in FIG. 10) the content of node 806 to client device 102. If, however, system 100 determines that the interaction data indicates that user 132 has not been in an accident, system 100 may determine another node in the group of nodes 124 (not shown) different from node 806 to be the subsequent node. The content of that other node can include further questions, which system 100 can push to client device 102 to evaluate user 132's needs.

Figure 11:
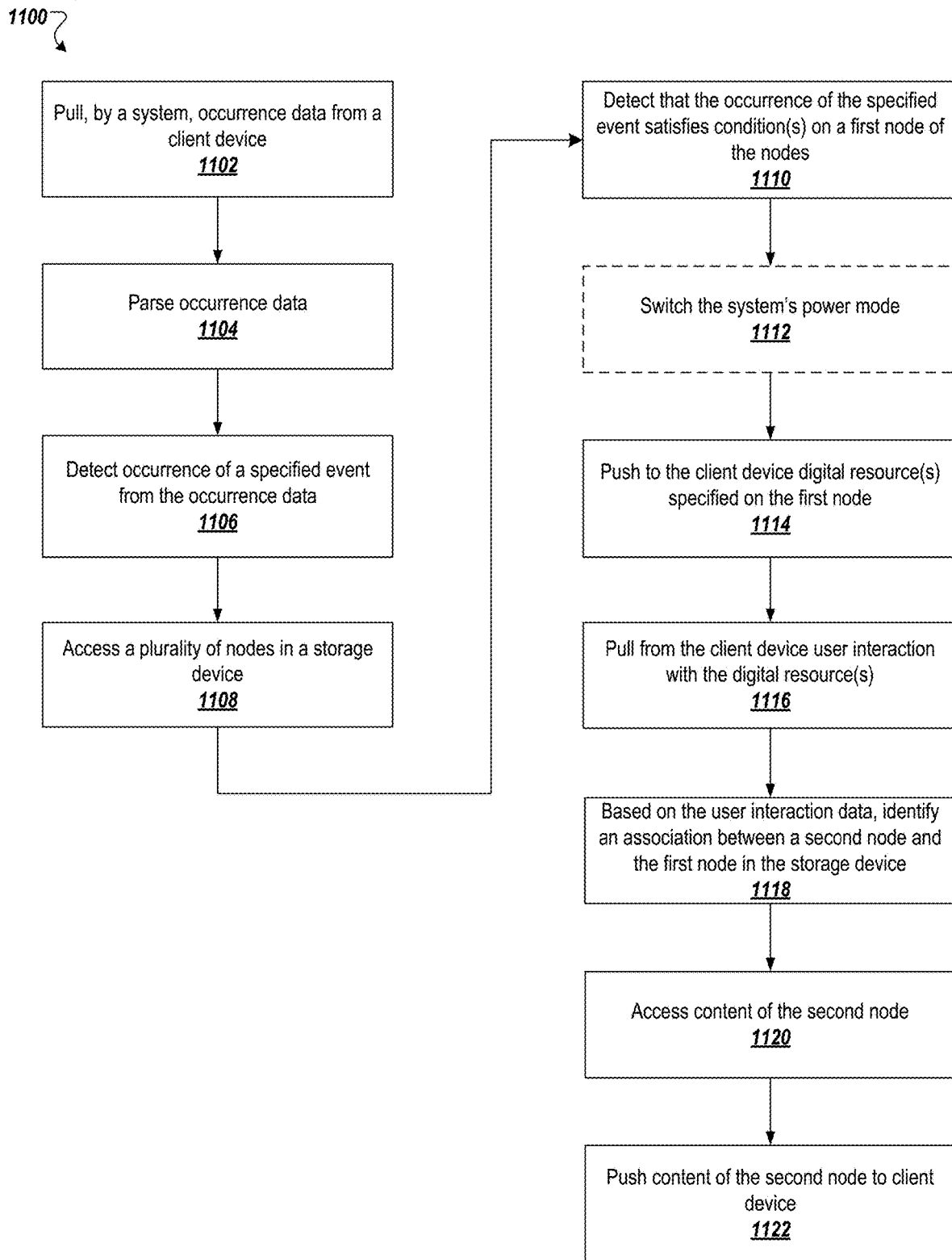
FIG. 11 is an example process that can be executed according to implementations of the present disclosure.

FIG. 11 is an example process 1100 that can be executed according to implementations of the present disclosure. The process 1100 can be performed by a computing system, for example, the data processing system 100 described in above.

The computing system pulls occurrence data from a client device (1102). For example, system 100 in FIG. 1 pulls occurrence data from client device 102.

The computing system parses occurrence data (1104) and detects an occurrence of a specified event from the parsed data (1106). For example, detection engine 108 of system 100 in FIG. 1 can parse the occurrence data 104. Detection engine 108 communicates with event storage device 114 to determine whether the parsed data includes a specified event stored on the storage device.

Based on the detection of the occurrence of the specified event, the computing system accesses a plurality of nodes in a storage device (1108). For example, detection engine 108 accesses a group of nodes 124 or 128 stored on node hardware storage device 122 based on the detected event. Each group of nodes includes a respective plurality of nodes and the association between the respective plurality of nodes. The associations specify one or more sequences for accessing contents of the nodes. At least a first one of the plurality of nodes, e.g., node 202 in the group of nodes 128, stores instructions representing one or more rules with associated one or more conditions, satisfaction of which specifies one or more digital resources to be pushed to the client device.

The computing device detects that the occurrence of the specified event satisfies one or more conditions associated with the one or more rules of the first one of the plurality of nodes (1110). For example, see node 202 in FIG. 2 and the condition specified there.

The computing device can optionally switch its power mode (1112), for example, in response to determining that the one or more conditions are satisfied at 1110. The computing device can switch from a lower power mode to a higher power mode that consumes more power relative to the lower power mode.

The computing device pushes to the client device one or more digital resources specified on the first node (1114). For example, in FIG. 3, system 100 pushes to client device 102 a digital resource 304 based on the digital resource 210 stored on node 204 of the group of nodes 128 (see FIG. 2). The digital resources can each be customized for the detected occurrence of the specified event.

The computing device pulls from the client device user interaction with at least one of the digital resources (1116). An example of this pulling is shown in FIG. 3, where system 100 pulls a signed signature card 308 from client device 102.

Based on the user interaction data, the computing device identifies an association between a second node and the first node in the plurality of nodes (1118). For example, in FIG. 3, listening engine 106 requests subsequent node contents 310. In response to determining that the user has signed the signature card, system 100 identifies an association between node 202 and node 206, and determines node 206 (see FIG. 4) as the subsequent node.

The computing system then accesses content of the second node (1120), and pushes the content of the second node to the client device (1122). FIG. 4 shows accessing content of the subsequent node 206. FIG. 5 shows pushing content of node 206 to client device 102. The pushed content can be rendered as one or more visualizations on a display of the client device.

Figure 12:
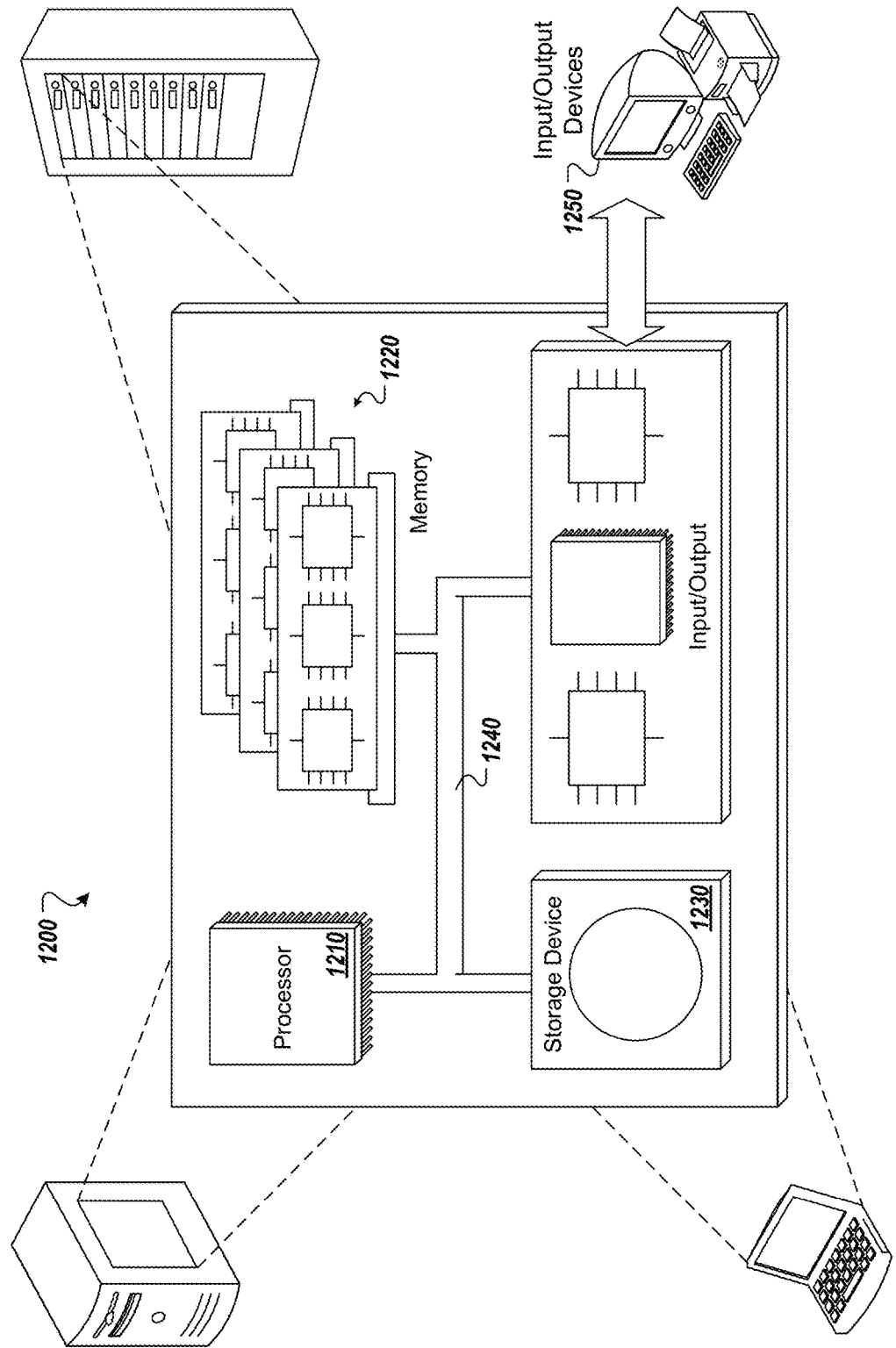
FIG. 12 depicts an example computing system according to implementations of the present disclosure.

FIG. 12 depicts an example computing system, according to implementations of the present disclosure. The system 1200 may be used for any of the operations described with respect to the various implementations discussed herein. For example, the system 1200 may be included, at least in part, in the data processing system 100, or the client device 102 described herein. The system 1200 may include one or more processors 1210, a memory 1220, one or more storage devices 1230, and one or more input/output (I/O) devices 1250 controllable through one or more I/O interfaces 1240. The various components 1210, 1220, 1230, 1240, or 1250 may be interconnected through at least one system bus 560, which may enable the transfer of data between the various modules and components of the system 1200.

The processor(s) 1210 may be configured to process instructions for execution within the system 1200. The processor(s) 1210 may include single-threaded processor(s), multi-threaded processor(s), or both. The processor(s) 1210 may be configured to process instructions stored in the memory 1220 or on the storage device(s) 1230. The processor(s) 1210 may include hardware-based processor(s) each including one or more cores. The processor(s) 1210 may include general purpose processor(s), special purpose processor(s), or both.

The memory 1220 may store information within the system 1200. In some implementations, the memory 1220 includes one or more computer-readable media. The memory 1220 may include any number of volatile memory units, any number of non-volatile memory units, or both volatile and non-volatile memory units. The memory 1220 may include read-only memory, random access memory, or both. In some examples, the memory 1220 may be employed as active or physical memory by one or more executing software modules.

The storage device(s) 1230 may be configured to provide (e.g., persistent) mass storage for the system 1200. In some implementations, the storage device(s) 1230 may include one or more computer-readable media. For example, the storage device(s) 1230 may include a floppy disk device, a hard disk device, an optical disk device, or a tape device. The storage device(s) 1230 may include read-only memory, random access memory, or both. The storage device(s) 1230 may include one or more of an internal hard drive, an external hard drive, or a removable drive.

One or both of the memory 1220 or the storage device(s) 1230 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1200. In some implementations, the CRSM may include a data store that provides storage of computer-readable instructions or other information in a non-transitory format. The CRSM may be incorporated into the system 1200 or may be external with respect to the system 1200. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1210 and the memory 1220 may be supplemented by, or incorporated into, one or more application-specific integrated circuits (ASICs).

The system 1200 may include one or more I/O devices 1250. The I/O device(s) 1250 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1250 may also include one or more output devices such as a display, LED(s), an audio output device (e.g., a speaker), a printer, a haptic output device, and so forth. The I/O device(s) 1250 may be physically incorporated in one or more computing devices of the system 1200, or may be external with respect to one or more computing devices of the system 1200.

The system 1200 may include one or more I/O interfaces 1240 to enable components or modules of the system 1200 to control, interface with, or otherwise communicate with the I/O device(s) 1250. The I/O interface(s) 1240 may enable information to be transferred in or out of the system 1200, or between components of the system 1200, through serial communication, parallel communication, or other types of communication. For example, the I/O interface(s) 1240 may comply with a version of the RS-232 standard for serial ports, or with a version of the IEEE 1284 standard for parallel ports. As another example, the I/O interface(s) 1240 may be configured to provide a connection over Universal Serial Bus (USB) or Ethernet. In some examples, the I/O interface(s) 1240 may be configured to provide a serial connection that is compliant with a version of the IEEE 1394 standard.

The I/O interface(s) 1240 may also include one or more network interfaces that enable communications between computing devices in the system 1200, or between the system 1200 and other network-connected computing systems. The network interface(s) may include one or more network interface controllers (NICs) or other types of transceiver devices configured to send and receive communications over one or more networks using any network protocol.

Computing devices of the system 1200 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1200 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input. In some instances, input and/or output may be received and/or provided through an augmented reality and/or virtual reality system.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification includes many specifics, these should not be construed as limitations on the scope of the disclosure or of what may be claimed, but rather as descriptions of features specific to particular implementations.

Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method implemented by a data processing system, comprising:

pulling, in a first power mode of at least a portion of the data processing system, occurrence data indicative of an occurrence in proximity to a client device;

parsing the occurrence data;

based on the parsing, detecting, in the occurrence data, an occurrence of a specified event; and based on the detecting, accessing, from a hardware storage device, a plurality of nodes and associations among the nodes, with the associations specifying one or more sequences for accessing contents of the nodes, and with at least a first one of the nodes storing instructions representing one or more rules with associated one or more conditions, satisfaction of which specifies one or more digital resources to push to the client device;

detecting that the occurrence of the specified event satisfies the one or more conditions associated with the one or more rules of the first one of the nodes; and switching the portion of the data processing system from the first power mode to a second power mode, wherein the first power mode consumes a lesser amount of power, relative to an amount of power consumed in the second power mode; and in the second power mode, pushing, to the client device through one or more communication channels, the one or more digital resources specified by at least the first one of the accessed nodes, wherein the one or more digital resources are each customized for the detected occurrence of the specified event;

pulling, from the client device through the one or more communication channels, interaction data specifying an interaction with at least one of the one or more digital resources;
based on the interaction data, identifying, in the hardware storage device, an association between a second node and the first one of the accessed nodes;
accessing, from the hardware storage device, contents of the second node; and
pushing, in live-time relative to a time of the interaction, the contents of the second node to the client device, with the contents being rendered as one or more visualizations on a display of the client device.

2. The method of claim 1, wherein at least part of the hardware storage device that is on a low power mode during the first power mode and turns to a high power mode during the second power mode.

3. The method of claim 1, wherein detecting the occurrence of the specified event comprises identifying, in the hardware storage device, a specified event that matches or is relevant to information included in the occurrence data.

4. The method of claim 1, wherein detecting the occurrence of the specified event comprises:
predicting a likelihood of the specified event happening in a future time, wherein the predicting is based on the occurrence data and subsequent occurrence data that the data processing system pulls from the client device;
and detecting the occurrence of the specified event in response to determining that the likelihood is greater than a specified threshold value.

5. The method of claim 1, wherein detecting the occurrence of the specified event comprises performing speech recognition on the occurrence data to detect one or more key words or phrases that are mapped, in the hardware storage device, to the specified event.

6. The method of claim 1, wherein the one or more digital resources include at least one of a signature card, a form, a document, or an augmented reality bot to assist a user of the user device on what to do.

7. The method of claim 1, wherein the specified event is a check engine light or a request identified based on an engagement with an avatar in a virtual environment.

8. A system comprising:
one or more computers and one or more storage devices storing instructions that are operable, when executed by the one or more computers, to cause the one or more computers to perform operations comprising:
pulling, in a first power mode of at least a portion of the data processing system, occurrence data indicative of an occurrence in proximity to a client device;
parsing the occurrence data;
based on the parsing, detecting, in the occurrence data, an occurrence of a specified event; and
based on the detecting,
accessing, from a hardware storage device, a plurality of nodes and associations among the nodes, with the associations specifying one or more sequences for accessing contents of the nodes, and with at least a first one of the nodes storing instructions representing one or more rules with associated one or more conditions, satisfaction of which specifies one or more digital resources to push to the client device;
detecting that the occurrence of the specified event satisfies the one or more conditions associated with the one or more rules of the first one of the nodes; and switching the portion of the data processing system from the first power mode to a second power mode, wherein the first power mode consumes a lesser amount of power, relative to an amount of power consumed in the second power mode; and
in the second power mode,
pushing, to the client device through one or more communication channels, the one or more digital resources specified by at least the first one of the accessed nodes, wherein the one or more digital resources are each customized for the detected occurrence of the specified event;
pulling, from the client device through the one or more communication channels, interaction data specifying an interaction with at least one of the one or more digital resources;
based on the interaction data, identifying, in the hardware storage device, an association between a second node and the first one of the accessed nodes;
accessing, from the hardware storage device, contents of the second node; and
pushing, in live-time relative to a time of the interaction, the contents of the second node to the client device, with the contents being rendered as one or more visualizations on a display of the client device.

9. The system of claim 8, wherein at least part of the hardware storage device that is on a low power mode during the first power mode and turns to a high power mode during the second power mode.

10. The system of claim 8, wherein detecting the occurrence of the specified event comprises identifying, in the hardware storage device, a specified event that matches or is relevant to information included in the occurrence data.

11. The system of claim 8, wherein detecting the occurrence of the specified event comprises:
predicting a likelihood of the specified event happening in a future time, wherein the predicting is based on the occurrence data and subsequent occurrence data that the data processing system pulls from the client device;
and detecting the occurrence of the specified event in response to determining that the likelihood is greater than a specified threshold value.

12. The system of claim 8, wherein detecting the occurrence of the specified event comprises performing speech recognition on the occurrence data to detect one or more key words or phrases that are mapped, in the hardware storage device, to the specified event.

13. The system of claim 8, wherein the one or more digital resources include at least one of a signature card, a form, a document, or an augmented reality bot to assist a user of the user device on what to do.

14. The system of claim 8, wherein the specified event is a check engine light or a request identified based on an engagement with an avatar in a virtual environment.

15. One or more non-transitory computer-readable storage media encoded with instructions that, when executed by one or more computers, cause the one or more computers to perform operations comprising:
pulling, in a first power mode of at least a portion of the data processing system, occurrence data indicative of an occurrence in proximity to a client device;
parsing the occurrence data;
based on the parsing, detecting, in the occurrence data, an occurrence of a specified event; and
based on the detecting, accessing, from a hardware storage device, a plurality of nodes and associations among the nodes, with the associations specifying one or more sequences for accessing contents of the nodes, and with at least a first one of the nodes storing instructions representing one or more rules with associated one or more conditions, satisfaction of which specifies one or more digital resources to push to the client device;

detecting that the occurrence of the specified event satisfies the one or more conditions associated with the one or more rules of the first one of the nodes; and switching the portion of the data processing system from the first power mode to a second power mode, wherein the first power mode consumes a lesser amount of power, relative to an amount of power consumed in the second power mode; and in the second power mode,
pushing, to the client device through one or more communication channels, the one or more digital resources specified by at least the first one of the accessed nodes, wherein the one or more digital resources are each customized for the detected occurrence of the specified event;

pulling, from the client device through the one or more communication channels, interaction data specifying an interaction with at least one of the one or more digital resources;

based on the interaction data, identifying, in the hardware storage device, an association between a second node and the first one of the accessed nodes;

accessing, from the hardware storage device, contents of the second node; and pushing, in live-time relative to a time of the interaction, the contents of the second node to the client device, with the contents being rendered as one or more visualizations on a display of the client device.

16. The storage media of claim 15, wherein at least part of the hardware storage device that is on a low power mode during the first power mode and turns to a high power mode during the second power mode.

17. The storage media of claim 15, wherein detecting the occurrence of the specified event comprises identifying, in the hardware storage device, a specified event that matches or is relevant to information included in the occurrence data.

18. The storage media of claim 15, wherein detecting the occurrence of the specified event comprises:

predicting a likelihood of the specified event happening in a future time, wherein the predicting is based on the occurrence data and subsequent occurrence data that the data processing system pulls from the client device;

and detecting the occurrence of the specified event in response to determining that the likelihood is greater than a specified threshold value.

19. The storage media of claim 15, wherein detecting the occurrence of the specified event comprises performing speech recognition on the occurrence data to detect one or more key words or phrases that are mapped, in the hardware storage device, to the specified event.

20. The storage media of claim 15, wherein the one or more digital resources include at least one of a signature card, a form, a document, or an augmented reality bot to assist a user of the user device on what to do.

* * * * *